I. H. SPENCER.
RUBBER WORKING MACHINE.
APPLICATION FILED JUNE 9, 1917.

1,326,375.

Patented Dec. 30, 1919.
2 SHEETS—SHEET 1.

INVENTOR.
Ira H. Spencer,
BY Arthur Jenkins,
ATTORNEY.

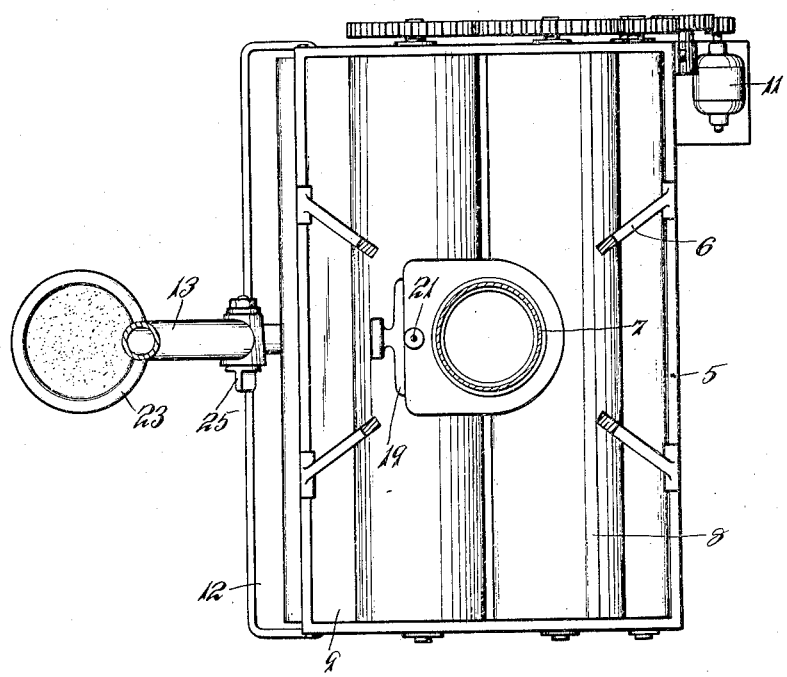

UNITED STATES PATENT OFFICE.

IRA H. SPENCER, OF WEST HARTFORD, CONNECTICUT, ASSIGNOR, BY MESNE ASSIGNMENTS, TO THE SPENCER TURBINE COMPANY, A CORPORATION OF CONNECTICUT.

RUBBER-WORKING MACHINE.

1,326,375.  Specification of Letters Patent.  Patented Dec. 30, 1919.

Application filed June 9, 1917. Serial No. 173,697.

*To all whom it may concern:*

Be it known that I, IRA H. SPENCER, a citizen of the United States, residing at West Hartford, in the county of Hartford and State of Connecticut, have invented a new and useful Improvement in Rubber-Working Machines, of which the following is a specification.

My invention relates to the class of machines above mentioned, and an object of my invention, among others, is to provide means for supplying material to the rolls of such a machine in an efficient manner.

One form of device embodying my invention and in the construction and use of which the objects herein set out, as well as others, may be attained, is illustrated in the accompanying drawings, in which:

Fig. 2 is a view in cross section through the same on plane denoted by dotted line 2—2 of Fig. 1.

Figure 1:
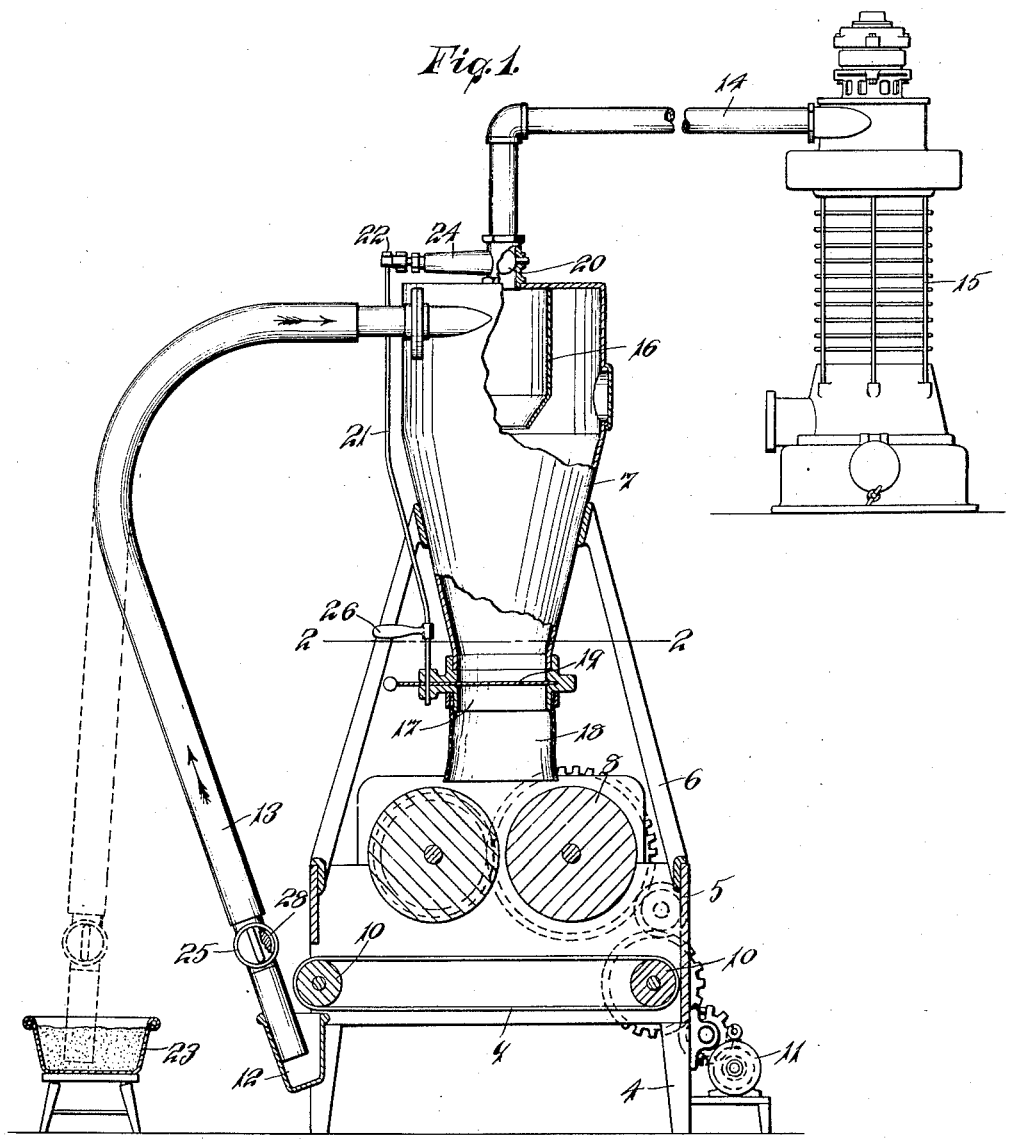
Figure 1 is a view in central vertical section through a machine embodying my invention.

In the manufacture of rubber a certain quantity of different materials comprising a "batch" is mixed and is then subjected to the action of rolls by which the material is taken up in the form of sheets wrapped about the rolls. The rolls will not at once retain all of the material, some of it passing between the rolls, and such material must again be delivered to the rolls to be taken up by them, as it is essential that all of the material comprising the "batch" shall be taken up. The sheets wrapped about the rolls are cut off and subjected again to the action of the rolls in a manner that is well understood by those skilled in the art, and further description of this process is, therefore, omitted herein.

The machine forming the subject matter of my present invention is designed to handle this batch of material in a thorough and efficient manner, such machine being shown in the drawings herein in which the numeral 4 indicates the legs, 5 a case, 6 posts, and 7 a hopper (in the form of a separator) of said machine. Rolls 8, of the kind used in rubber working machines, are located in the case 5, these rolls being driven by power applied from any suitable source, as from a motor 11. Underneath these rolls and within the case 5 I locate a carrier, that, in the form herein shown, comprises an endless belt 9 supported on rolls 10, which rolls may be driven as by the motor 11. The belt is mounted to deliver material deposited thereon to a trough 12 that opens partially within the case 5 and partially outside of the same. This trough tapers from its top to the bottom thereof, the bottom being preferably of a width substantially the same as the diameter of a conveyer tube 13 that is connected with the upper end of the hopper.

Said hopper 7 is connected by a pipe 14 with a suction apparatus 15 that may be of any desirable form and construction, a portion of such apparatus, only, being shown herein. In the preferred form of construction the hopper has a deflector 16 projecting from the top in a manner common to devices of this kind and the lower end of said hopper is tapered from a larger to a smaller dimension, and it has an outlet 17 that may be provided with a tubular apron 18 to direct the material onto the rolls 8. A valve 19 of any suitable construction, that herein shown being a gate valve, is provided to close the mouth of the outlet and to regulate the delivery of the material from the hopper to the roll 8. It is important that when the outlet 17 is opened the flow of air through the pipe 14 to the suction apparatus 15 shall be stopped, or, in any event, that the volume of air thus flowing shall not be increased, as otherwise material would be carried from within the hopper to the suction apparatus, and such a result would be objectionable.

I therefore provide a valve 20 in the pipe 14, which valve may be of any ordinary form and construction to regulate the flow of air through said pipe. A valve operating rod 21 extends from a valve lever 22 to the valve 19 and projects into an opening in the gate valve. The length of this rod is such that it will project through said opening to such extent that it cannot be disengaged from said opening until the valve 20 is closed. This construction, therefore, prevents any opening of the valve 19 until the valve 20 has been closed.

In the operation of the device a portion of the materials having been mixed and placed in a pan 23 to form the batch, and the suction pump 15 being in operation, and the valve 19 being closed, and the valve 20 being open, as shown in Fig. 1 of the drawings, the end of the tube 13 is inserted in the pan 23 and the material is drawn into the hopper 7 and is deposited in the lower part thereof. The valve operating rod 21, as by means of the handle 26, is raised until its lower end is disengaged from the valve 19. This operation of the valve rod will close the valve 20 and the valve 19 may be opened. In this position the lower end of the rod 21 will rest against the upper surface of the valve 19 and prevent opening movement of the valve 20. The material may pass from the hopper 7 to the rolls 8, its flow being regulated by the valve 19 and at this point it will be mixed with crude rubber fed to the rollers by hand or otherwise. Most of the material will be taken up by the rolls 8 but such as passes through them will be deposited upon the carrier belt 9 by which it will be conveyed to the trough 12. The end of the tube 13 is now inserted in the trough 12 and the material therein is again conveyed to the hopper 7, the valve 19 being closed during this operation, the closing of said valve 19 permitting the valve 20 to be opened to permit passage of air through the pipe 14. This operation may be repeated so long as any material drops from the rolls 8. The manipulation of the material upon the rolls 8 will be readily understood by those skilled in the art.

In the construction herein shown a supporting sleeve 24 extends from the valve case 20, and the valve spindle of said valve extends through this sleeve and has a bearing therein, the valve lever 22 being secured to the outer end of said spindle. A valve 25 is located near the inlet of the conveyer tube 13 to control flow of material thereto, and this valve may be of any well known type of self closing valve, a spring 28 being shown herein as a means for closing the valve.

In accordance with the provisions of the patent statutes, I have described the principles of operation of my invention, together with the apparatus which I now consider to represent the best embodiment thereof; but I desire to have it understood that the device shown is only illustrative, and that the invention can be carried out by other means.

I claim—

1. In combination with the rolls of a rubber making machine, a hopper located to deliver material to said rolls, a suction pump connected with said hopper, a delivery tube connected with said hopper, a valve to control flow of air from the hopper to the pump, means to control the supply of material from the hopper to the rolls, and a connection between said valve and controlling means to determine the operation of one by the position of the other.

2. In combination with the rolls of a rubber making machine, a hopper located to deliver material to said rolls, a suction pump connected with the hopper, means for conducting material to the hopper, a valve to control the flow of air from the hopper to the pump, means for controlling the supply of material from the hopper to the rolls, and a connection between said valve and said supply means whereby the location of the latter controls the operation of said valve.

3. In combination with the rolls of a rubber making machine, a hopper located to deliver material to said rolls, a suction pump connected with the hopper, means for supplying material to the hopper, a valve to control flow of air from the hopper to the pump, a supply valve to control the supply of material from the hopper to the rolls, a rod connected with said air valve, and means appurtenant to the supply valve to control the operation of said air valve.

4. In combination with the rolls of a rubber making machine, a hopper located to deliver material to said rolls, a suction pump connected with said hopper, means for supplying material to the hopper, an air valve for controlling the flow of air from the hopper to the suction pump, a supply valve to control supply of material from the hopper to the rolls, and a connection between said valves whereby the position of each controls the operation of the other.

5. In combination with the rolls of a rubber making machine, a hopper located to deliver material to said rolls, a suction pump connected with said hopper, means for supplying material to the hopper, an air valve for controlling flow of air from the hopper to the suction pump, a supply valve to control the supply of material from the hopper to the rolls, and a connection between said air valve and supply valve to lock the latter in its closed position when the air valve is open, and to unlock the supply valve when the air valve is closed.

6. In combination with the rolls of a rubber making machine, a hopper located to deliver material to said rolls, a suction pump connected with said hopper, means for supplying material to the hopper, an air valve to control flow of air from the hopper to the suction pump, supply means to control the supply of material from the hopper, a rod to operate said air valve, said rod being constructed to lock the supply means in its closed position when the air valve is open, but to permit opening movement of the supply means when the air valve has been closed sufficiently to avoid injury to the apparatus.

7. In combination with a hopper located to deliver material from the outlet thereof, a suction pump connected with said hopper, a delivery tube connected with said hopper, a valve to control flow of air from the hopper to the pump, means to control the supply of material delivered from the hopper, and a connection between said valve and controlling means to determine the operation of one by the position of the other.

8. The combination with a hopper located to deliver material from the outlet thereof, a suction pump connected with the hopper, means for conducting material to the hopper, a valve to control the flow of air from the hopper to the pump, means for controlling the supply of material delivered from the hopper, and a connection between said valve and said supply means whereby the location of the latter controls the operation of said valve.

9. In combination with a hopper located to deliver from the outlet thereof, a suction pump connected with the hopper, means for supplying material to the hopper, a valve to control flow of air from the hopper to the pump, a supply valve to control the supply of material delivered from the hopper, a rod connected with said air valve, and means appurtenant to the supply valve to control the operation of said air valve.

10. In combination with a hopper located to deliver material from the outlet thereof, a suction pump connected with said hopper, means for supplying material to the hopper, an air valve for controlling the flow of air from the hopper to the suction pump, a supply valve to control supply of material delivered from the hopper, and a connection between said valves whereby the position of each controls the operation of the other.

11. In combination with a hopper located to deliver material from the outlet thereof, a suction pump connected with said hopper, means for supplying material to the hopper, an air valve for controlling flow of air from the hopper to the suction pump, a supply valve to control the supply of material delivered from the hopper, and a connection between said air valve and supply valve to lock the latter in its closed position when the air valve is open, and to unlock the supply valve when the air valve is closed.

12. In combination with a hopper located to deliver material from the outlet thereof, a suction pump connected with said hopper, means for supplying material to the hopper, an air valve to control flow of air from the hopper to the suction pump, supply means to control the supply of material from the hopper, a rod to operate said air valve, said rod being constructed to lock the supply means in closed position when the air valve is open, but to permit opening movement of the supply means when the air valve has been closed sufficiently to avoid injury to the apparatus.

IRA H. SPENCER.